(12) United States Patent
Liou et al.

(10) Patent No.: US 6,484,063 B1
(45) Date of Patent: Nov. 19, 2002

(54) SYSTEM AND METHOD OF INSPECTING TOOLING FOR FEASIBILITY

(75) Inventors: Shuh-Yuan Liou, Troy, MI (US); Yong Pan, Canton, MI (US); Tony Lu, Canton, MI (US); Harry Li, Windsor (CA); Girish Kunjur, Southgate, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/437,121

(22) Filed: Nov. 10, 1999

(51) Int. Cl.⁷ .............................................. G06F 17/50
(52) U.S. Cl. ............................ 700/98; 700/97; 345/964
(58) Field of Search ............................ 700/97, 98, 103, 700/104; 703/1, 7; 345/964, 419, 420

(56) References Cited

U.S. PATENT DOCUMENTS

| 5,552,995 A | | 9/1996 | Sebastian |
| 5,822,206 A | | 10/1998 | Sebastian et al. |
| 5,865,750 A | | 2/1999 | Hatfield et al. |
| 5,933,146 A | * | 8/1999 | Wrigley ....................... 345/420 |

FOREIGN PATENT DOCUMENTS

| GB | 2 325 066 A | 11/1998 |
| JP | 9147144 | 6/1997 |
| JP | 11147226 | 6/1999 |

OTHER PUBLICATIONS

Development and Practical Use of Computer Aided Design and Evaluation System for Stamping Dies. Technology Price. Akira Takahashi et al. (Toyota Motor Co.). pp. 28–33.

A Development of Expert Design System and Draw Die in Automotive Industry. Tae–Soo Kim et al. Korea Institute of Science and Technology. pp. 843–53.

* cited by examiner

*Primary Examiner*—Leo Picard
*Assistant Examiner*—Alexander Kosowski
(74) *Attorney, Agent, or Firm*—John E. Kejander

(57) ABSTRACT

The invention involves a system and a method of inspecting a selected part design from an inventory of computer-aided part designs for die compliance as to the part design's geometric characteristics of die lock, draft, and sharp edge. The invention provides for an improvement of inspecting a computer-aided part design in order to lessen insufficient inspections which lead to manufacturing infeasibilities. The invention includes selecting a part design, defining a die open direction, evaluating die lock and draft characteristics of the selected part design, and evaluating sharp edge characteristics of the selected part design.

8 Claims, 3 Drawing Sheets

SYSTEM AND METHOD OF INSPECTING TOOLING FOR FEASIBILITY

TECHNICAL FIELD

The present invention relates to a system and method of inspecting a selected part design from an inventory of computer-aided part designs for die compliance as to geometric characteristics of the part design with respect to die lock, draft, and sharp edge.

BACKGROUND ART

The number of design inspections performed on parts or workpieces increases each year as the supply of parts increase. In turn, the need for more effective design inspections also grows. More specifically, the need for a more efficient method of inspecting computer-aided part designs for die casting, injection molding, and stamping continues to increase, which increases part design productivity.

In the automotive industry, many parts are designed by using computer-aided software and hardware systems. For example, a system in which parts are created on a computer is called a computer aided design (CAD) system. A system in which parts may be manufactured by control of a computer is called a computer aided manufacturing (CAM) system. A CAD/CAM system aids the designer in several ways such as in developing the geometric detail required for the part which includes shape, dimensions, tolerance, etc. Alternatively, parts may be designed by other ways such as by machining which do not involve computer aided systems. However, without a CAD/CAM system, design and manufacturing costs and time typically are substantially higher.

Computer-aided part designs may or may not be evaluated prior to physically constructing the tool or the die thereof. In some situations, the dies of computer-aided part designs are directly constructed or "hand tooled." Then, after construction, the die is tested by actually attempting to manufacture the computer-aided part design. If no problems arise, then the part design is complete. However, if problems arise such as die lock, draft, or sharp edge, then further designing is necessary for the part design. In such situations, part designing may become very expensive and time consuming.

Also, computer-aided part designs may be checked manually for manufacturing or tooling feasibility and design efficiency, which may also result in very high costs. Typically, after the computer-aided part design is completed by a design engineer, a product engineer inspects the design for potential die lock, insufficient draft, and sharp edge. However, in most situations, the inspection involves only a manual or "eyeball" check. In fact, the only detailed inspection that is performed occurs when the manufacturer or supplier checks the part design for die lock, draft, and sharp edge by manual calculation methods. In some situations, a manual check is not sufficiently accurate in detecting die lock, draft and sharp edge. An insufficient inspection may result in manufacturing infeasibilities which consumes time and, in turn, leads to higher costs.

In many situations, the product engineer or manufacturer determines that the part design has die lock, insufficient draft, or a sharp edge. In this event, the design engineer is then notified that further design and modifications are required thereto, reducing design efficiency and productivity. Particularly, this increases the design time and labor costs, and decreases production rates and product quality rates. As an ultimate result, costs are increased.

Additionally, some CAD/CAM systems are provided with basic evaluations for computer-aided part designs. Typically, such basic evaluations include simple algorithms to check for basic compliance as to a single characteristic of the part design, such as draft characteristics. By only performing basic evaluations of the part design, as a result, insufficient evaluations occur more frequently than desired. Insufficient evaluations frequently lead to more time required for further designing.

Thus, what is needed is an improvement in the inspecting of computer-aided part designs for tool feasibility to increase part design efficiency and productivity.

DISCLOSURE OF THE INVENTION

Accordingly, it is an object of the present invention to provide an improved system and method of inspecting a selected part design from an inventory of computer-aided part designs in order to meet the demand for higher design efficiency which increases the productivity of part designs.

It is a further object of the present invention to provide an improved system and method of inspecting a computer-aided part design in order to lessen inaccurate inspections which lead to manufacturing infeasbilities.

A more specific object of this invention is a method of inspecting a selected part design from an inventory of computer-aided part designs for die compliance as to the part design's geometric characteristics of die lock, draft, and sharp edge. The method involves selecting the part design to be inspected for die lock, draft, and sharp edge compliance so that geometric information for the selected part design is acquired and defining a die open direction for the selected part design based on the geometric information of the selected part design. After defining the die open direction, the method then involves evaluating the die lock and draft characteristics of the selected part design with respect to the defined die open direction. This is done to determine if the die will open in the direction defined. Then, the method involves evaluating the sharp edge characteristic of the part design irrespective of the defined die open direction. This is performed in order to determine the degree of edge sharpness in comparison to a predetermined geometric characteristic of edge sharpness for the selected part design.

Another specific object of this invention is a more specific method of inspecting a selected part design from an inventory of computer-aided part designs for die compliance as to the part design's geometric characteristics of die lock, draft, and sharp edge. The method involves selecting the part design to be inspected for die lock, draft, and sharp edge compliance so that geometric information for the selected part design is acquired and defining a die open direction for the selected part design based on the geometric information of the selected part design. After defining the die open direction, the method includes selecting a die lock, a draft, or a sharp edge evaluation which is to be performed on the selected part design. If the die lock evaluation is selected, then the method involves determining whether the workpiece is complex.

If the workpiece is determined to be not complex, then the method involves casting evenly-spaced rays through the surfaces of the designed workpiece such that the casted rays are parallel to the defined die open direction and sorting the points of intersection for each ray. If any casted ray has greater than a threshold intersecting number, then the workpiece has die lock.

If the workpiece is determined to be complex, then the method involves defining a normal vector originating from a surface of the part design and casting a single ray from the origin of the normal vector such that the casted ray is parallel and in the same direction as the normal vector. Then, the method includes determining the number of intersections of the single casted ray and determining that the workpiece has die lock if the single casted ray is greater than a maximum intersection number.

If the draft evaluation is selected, then the method involves defining a normal vector for a surface and finding a first angle between the normal vector and the die open direction. If the difference between a reference angle and the first angle is found to be less than a minimum draft angle, then the method involves indicating that the surface has insufficient draft. If not, then the method includes indicating that the surface has sufficient draft.

If the sharp edge evaluation is selected, then the method involves determining a second angle between a pair of adjoining surfaces to define an edge and determining a supplementary angle of the second angle. If the supplementary angle is greater than a maximum sharp edge angle, then the method involves indicating that the edge has a sharp edge.

Another specific object of this invention is an inspection system of a selected part design from an inventory of computer-aided part designs for die compliance as to the part design's geometric characteristics of die lock, draft, and sharp edge. The system includes a mechanism for selecting the part design to be inspected for die lock, draft, and sharp edge compliance such that geometric information for the selected part design is acquired. The system further includes a mechanism for defining a die open direction for the selected part design based on the geometric information of the selected part design. The system further includes a mechanism for evaluating the die lock and draft characteristics of the selected part design with respect to the defined die open direction to determine if the die will open in the direction defined. The system also includes a mechanism for evaluating the sharp edge characteristic of the part design irrespective of the defined die open direction to determine the degree of edge sharpness in comparison to a predetermined geometric characteristic of edge sharpness for the selected part design.

BEST MODES FOR CARRYING OUT THE INVENTION

Figure 1:
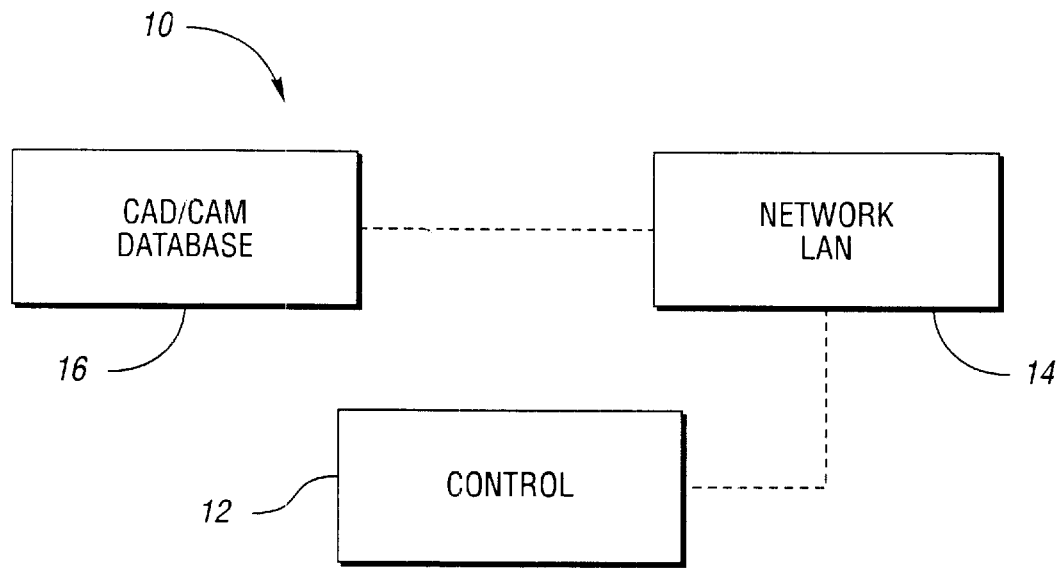
FIG. 1 is a flowchart illustrating the overall inspection system in accordance with one embodiment of the present invention.

FIG. 1 schematically illustrates a system used for inspecting a selected part design from an inventory of computer-aided part designs for die compliance as to the part design's geometric characteristics of die lock, draft, and sharp edge. System 10 includes a control 12, a local access network (LAN) 14, and a CAD/CAM database 16. As shown in FIG. 1, LAN 14 is in communication with control 12 and CAD/CAM database 16 is in communication with LAN 14.

Control 12 provides a mechanism (described hereinafter) for selecting a part design to be inspected for die lock, draft, and sharp edge compliance such that geometric information for the selected part design is acquired. Control 12 also provides a mechanism for defining a die open direction for the selected part design based on the geometric information of the selected part design.

LAN 14 provides a mechanism for evaluating the die lock and draft characteristics of the selected part design with respect to the defined die-open direction to determine if the die will open in the direction defined. LAN 14 also provides a mechanism for evaluating the sharp edge characteristic of the part design irrespective of the defined die open direction in order to determine the degree of edge sharpness which is compared to a predetermined geometric characteristic of edge sharpness for the selected part design.

CAD/CAM database 16 provides a mechanism from which the part design's geometric characteristics of die lock, draft, and sharp edge may be acquired.

Figure 2:
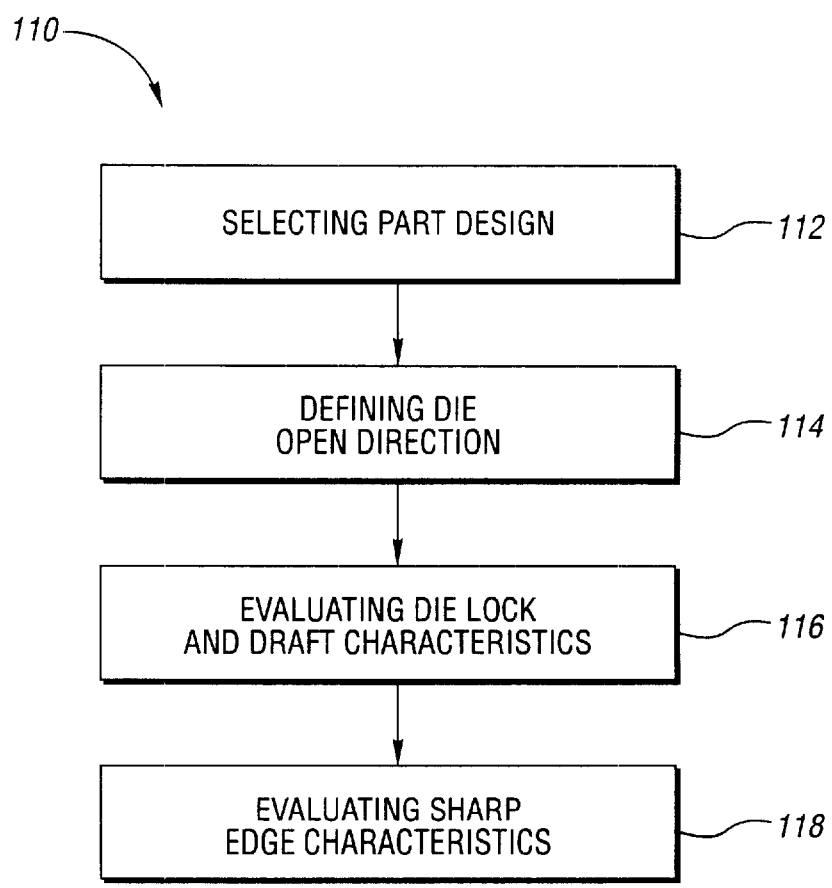
FIG. 2 is a flowchart illustrating one method of inspection provided by the present invention in accordance with the system of FIG. 1.

FIG. 2 illustrates a general method of a present invention in accordance with system 10 of FIG. 1. The method as generally shown in reference 110 of FIG. 2 includes selecting the part design to be inspected in 112; defining a die open direction for the selected part design in 114; evaluating the die lock and draft characteristics of the selected part design with respect to the defined die open direction in 116; and evaluating the sharp edge characteristic of the part design in 118.

Figure 3:
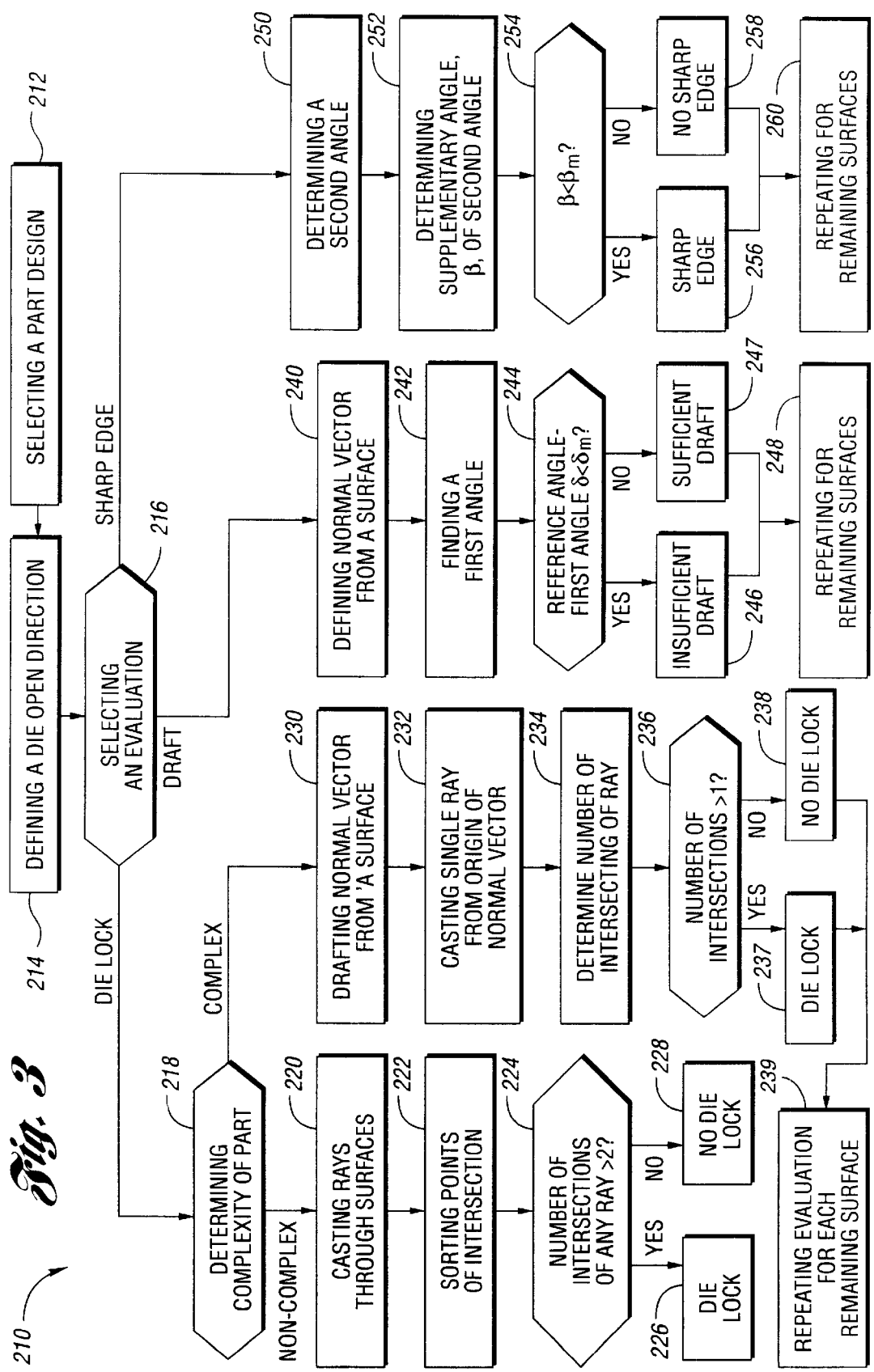
FIG. 3 is another flowchart illustrating another method of the present invention in furtherance of the method of FIG. 2.

As shown, FIG. 3 illustrates an example of the general method of FIG. 2. In this embodiment, control 12 displays selection windows of a graphical user interface on a computer monitor with which a user may interact by using a conventional mouse or touchpad. The mouse or touchpad may, in turn, be in communication with a central processing unit which may be in communication with the computer monitor.

Within a setup mode of the selection windows, the user selects a part design to be inspected for die lock, draft, and sharp edge compliance such that geometric information for the selected part is acquired in 212. In accordance with the selected part design, control 12 Via LAN 14 acquires geometric information of the selected part design from CAD/CAM database 16 which may include geometric information of a number of other part designs.

After acquiring the geometric information from CAD/CAM database 16 Via LAN 14, control 12 displays an image, preferably a three-dimensional image, of the part design. The image of the selected part design may be developed using several different techniques. In this embodiment, a three-dimensional image of the selected part is displayed by control 12 using triangular mesh techniques. However, other methods or techniques would not fall beyond the scope of the invention.

With the three-dimensional image of the selected part design displayed, a die open direction is defined in 214. The die open direction may be defined by outlining a direction with the conventional mouse (not shown), indicating the direction in which a main die may be pulled out from a mold. Then, a selection is made by the user in 216 as to which evaluation is to be performed, die lock, draft, or sharp edge.

If die lock is selected, then control 12 evaluates the die lock characteristics of the selected part design with respect to the defined die open direction. With the die lock characteristics, control 12 determines whether the die will open in the direction defined.

As shown in FIG. 3, one example of determining whether the die will open in the direction defined includes determining the complexity of the selected part design in 218. That is, control 12 determines whether the selected part includes surfaces having shapes that are complex. In this embodiment, control 12 implements ray casting techniques, wherein evenly-spaced rays are casted parallel the die open direction and through the selected part design by control 12. In this embodiment, generally, ray casting involves calculating or "casting" a vector or "ray" from an origin towards a direction, preferably by control 12. Control 12 determines the number of casted rays required to cover the selected part design based on the geometry thereof. In this embodiment, if the number exceeds a predetermined threshold number, then the selected part design is complex. If not, then the design is non-complex. For example, if the threshold number is 2000 casted rays, and the required number is 500 casted rays, then the design is non-complex.

If the selected part design is non-complex, then, in 220, the rays are casted parallel the die open direction and through the selected part design, evenly covering the design surfaces extending transverse the die open direction. Control 12 sorts the points of intersection in 222. That is, control 12 determines the number of surfaces each casted ray intersects and compares the number with a threshold intersecting number in 224. If the intersecting number is greater than the threshold intersecting number, then the part design has die lock characteristics in 226. If not, then the part design has no die lock characteristics in 228.

For example, if the threshold intersecting number is 2 and the number of surfaces a ray intersects is 4, then the part design has die lock characteristics. Any number greater than 2 would be indicative of an undercut, potentially causing a manufacturing infeasibility.

If the selected part design is complex, then control 12 directs a normal vector having an origin on a surface of the design in 230 and casts a single ray from the origin thereof in 232. The ray is casted parallel the die open direction and in the same direction as the normal vector. Then, control 12 determines the number of surfaces the casted ray intersects in 234. If the number of surfaces the ray intersects is greater than 1 in 236, then the design has die lock characteristics in 237. If not, then the design does not have die lock characteristics in 238. Control 12 repeats this determination for each surface of the selected part design in 239.

For example, if the number of surfaces the ray intersects is 3, then the design has die lock characteristics. Any number greater than 1 would be indicative of an undercut, potentially causing a manufacturing infeasibility.

In this embodiment, several approaches and techniques may be implemented in order to improve efficiency in determining die lock in complex part designs. For example, an approach may be used to decrease the number of casted rays upon surfaces adjacent those having no die lock and facing the same die open direction as a surface being inspected. Such surfaces which have no intersecting surfaces, by definition, also have no die lock and may be immediately determined to have no die lock.

Additionally, the determinations mentioned above in this embodiment are performed based on costs and required time for each evaluation. For example, the evaluation of die lock for a non-complex part design may include casting less than 2000 rays through the part design transverse surfaces. Casting 2000 or more rays may be substantially more time consuming and costly. Thus, casting single rays from each surface is used for more complex part designs. However, other evaluations or combinations thereto do not fall beyond the scope of the invention.

If the draft evaluation is selected, then control 12 evaluates the draft characteristics of the selected part design with respect to the defined die open direction. With the draft characteristics, control 12 determines whether the die will open in the direction defined.

As shown in FIG. 3, one example of determining whether the die will open with respect to draft characteristics includes having a normal vector directed from a surface of the selected part design in 240, preferably by control 12. Then, control 12 finds a first angle which, in this embodiment, is defined to be between the normal vector and the die open direction in 242. Then, control 12 calculates a difference, δ, between the first angle and a reference angle. The reference angle is preferably 90 degrees.

If the absolute value of the difference, δ, is less than a minimum draft angle in 244, then control 12 recognizes the surface as having insufficient draft, potentially causing die lock in 246. If not, then no insufficient draft is recognized in 247. Control 12 repeats the draft evaluation for all remaining surfaces in 248.

If the sharp edge evaluation is selected, then control 12 evaluates the sharp edge characteristic of the part design irrespective of the defined die open direction. With the sharp edge characteristics, control 12 determines the degree of edge sharpness in comparison to a predetermined geometric characteristic of edge sharpness for the selected part design.

One example of determining the degree of edge sharpness includes having all adjoining surfaces evaluated for sharp edge. As shown in FIG. 3, for each pair of adjoining surfaces, a second angle is calculated between pairs of adjoining surfaces in 250. Then a supplementary angle, β, is determined by subtracting the second angle from 180 degrees. After determining the supplementary angle β of the second angle in 252, control 12 determines whether the supplementary angle is greater than a maximum sharp edge angle in 254. If so, then the pair of adjoining surfaces have sharp edge in 256. If not, no sharp edge is recognized in 258. Control 12 repeats the sharp edge evaluation for each remaining pair of adjoining surfaces in 260.

Figure 4:
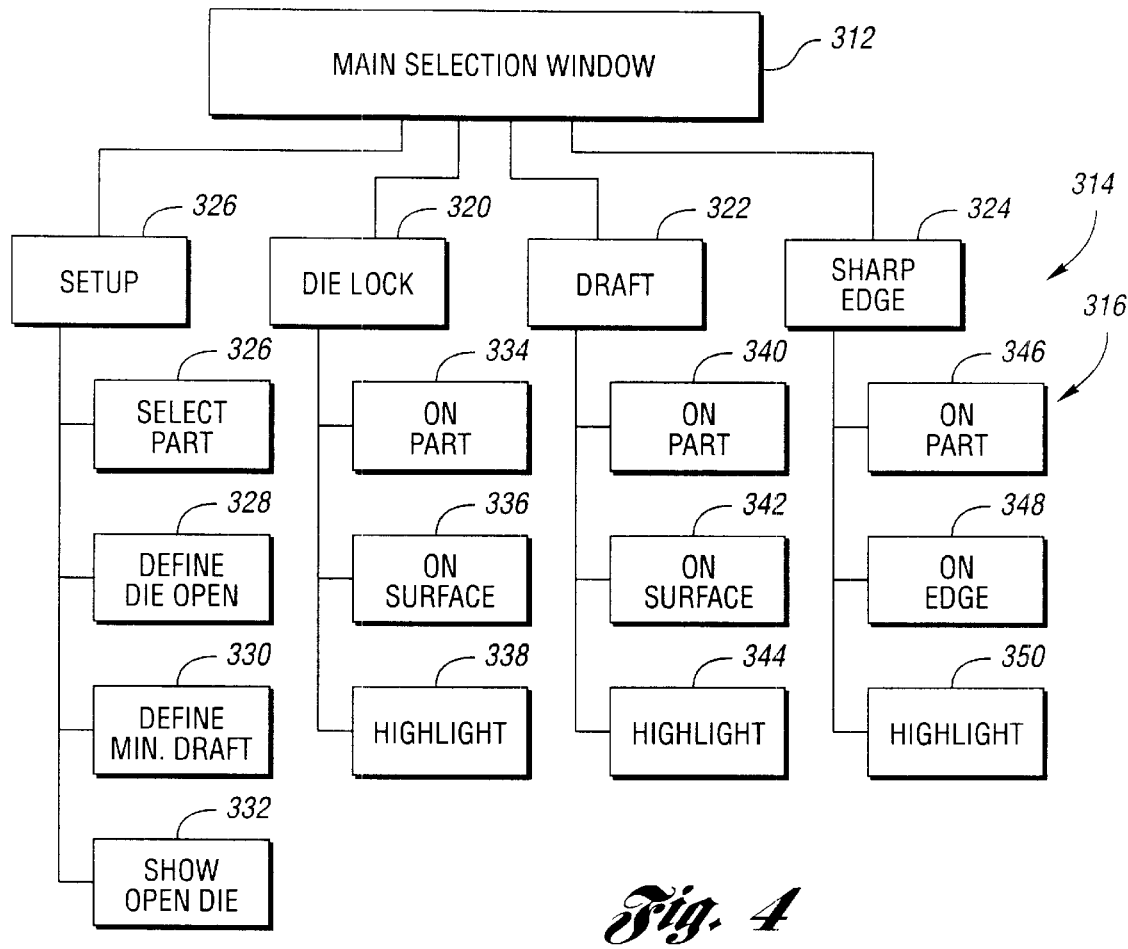
FIG. 4 is a flowchart of selection windows implemented in the method illustrated in FIG. 3.

In this embodiment, control 12 provides several selection windows with which a user may interact. For example, FIG. 4 shows an example of a command process flowchart of the selection windows which control 12 may display in the method illustrated in FIG. 3. For example, Main Selection Window 312 of FIG. 4 may be displayed by control 12 in a graphical configuration depicted in FIG. 5.

Figure 5:
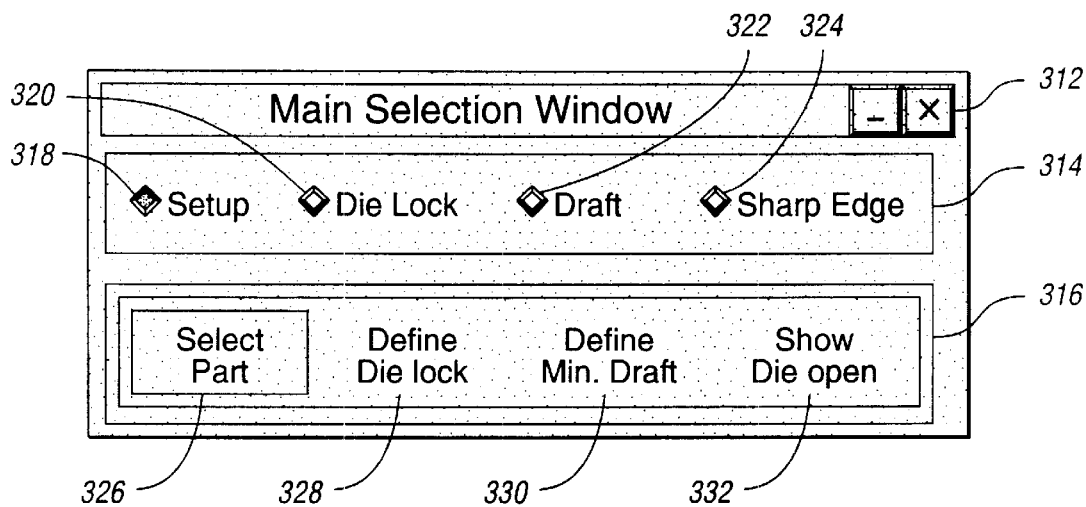
FIG. 5 is an image of an example of a main selection window of the flowchart of FIG. 4.

As shown in FIG. 5, Main Selection Window 312 includes a first selection group 314 and a second selection group 316 having selection items from which a user may choose. First selection group 314 is shown to be a row having setup 318, die lock 320, draft 322, and sharp edge 324 selection items. Second selection group 316 includes a number of selection items which are displayed in accordance to the items selected in first selection group 314.

In this embodiment, as shown in FIG. 4, if setup 318 of first selection group 314 is selected, then second selection group 316 includes the following selection items: select part 326, define die open 328, define minimum draft 330, and show die open 332. If die lock 320 is chosen, then second selection group 316 includes on part 334, on surface 336, and highlight 338. If draft 322 is selected, on part 340, on surface 342, and highlight 344 is displayed. If harp edge 324 is selected from first selection group 314, then on part 346, on surface 348, and highlight 350 may be selected from second selection 316.

Control 12 may be any type of central processing unit with a compatible monitor, such as a Pentium computer with any suitable compatible monitor. LAN 14 may be any suitable local access network such as a Unix system. LAN 14 is preferably a network system that can run SUN, HP, Silicon, Graphics, or NT workstations. CAD/CAM database 16 may be any suitable database that can store graphical information of a part design accessible by LAN 14.

Method 110 and 210 preferably are programmable methods which may be developed for installment in LAN 14. In communication with LAN 14, control 12 may access programmable methods when desired by a user. In communication with CAD/CAM database 16, LAN 14 may access geometric information of the selected part therefrom when chosen by the user with control 12.

While the best mode for carrying out the invention has been described in detail, those familiar with the art to which this invention relates will recognize various alternative designs and embodiments for practicing the invention as defined by the following claims.

What is claimed is:

1. A method of inspecting a selected part design from an inventory of computer-aided part designs for die operation compliance as to the part design's geometric characteristics of die lock, draft, and sharp edge, the method comprising:

selecting the part design to be inspected for die lock, draft, and sharp edge compliance so that geometric information for the selected part design is acquired;

defining a die open direction for the selected part design based on the geometric information of the selected part design;

evaluating the die lock and draft characteristics of the selected part design with respect to the defined die open direction to determine if the die will open in the direction defined; and evaluating the sharp edge characteristic of the part design irrespective of the defined die open direction to determine the degree of edge sharpness in comparison to a predetermined geometric characteristic of edge sharpness for the selected part design.

2. The method of claim 1 wherein evaluating the die lock and draft characteristics includes determining whether the part design is complex.

3. The method of claim 2 wherein evaluating the die lock and draft characteristics further includes:

if the part design is determined to be not complex, then casting evenly-spaced rays through the surfaces of the designed part design, the casted rays being parallel to the die open direction;

sorting the points of intersection for each ray; and if any casted ray has greater than two surface intersections, then determining that the part design has die lock.

4. The method of claim 2 wherein evaluating the die lock and draft characteristics further includes:

if the part design is determined to be complex, then defining a normal vector having an origin from a surface of the part design;

casting a single ray from the origin of the normal vector, the casted ray being in the direction parallel the die open direction;

determining the number of intersections of the single casted ray; and if the single casted ray has greater than one intersection, then determining that the part design has die lock.

5. The method of claim 1 wherein evaluating the die lock and draft characteristics further includes:

defining a normal vector from a surface;

finding a first angle between the normal vector and die open direction;

if the difference between a reference angle and the first angle is less than a minimum draft angle, then indicating the surface as having insufficient draft; and if the difference between the reference angle and the first angle is greater than the minimum draft angle, then indicating the surface as having sufficient draft.

6. The method of claim 1 wherein evaluating the sharp edge characteristic includes:

determining a second angle between a pair of adjoining surfaces to define an edge;

determining a supplementary angle of the second angle;

if the supplementary angle is greater than a minimum sharp edge angle, then indicating the edge as having a sharp edge; and if the supplementary angle is less than the sharp edge angle, then indicating the edge as not having a sharp edge.

7. A method of inspecting a selected part design from an inventory of computer-aided part designs for die operation compliance as to the part design's geometric characteristics of die lock, draft, and sharp edge, the method comprising:

selecting the part design to be inspected for die lock, draft, and sharp edge compliance so that geometric information for the selected part design is acquired;

defining a die open direction for the selected part design based on the geometric information of the selected part design;

selecting the die lock, the draft, or the sharp edge evaluation to be performed on the selected designed part design;

if the die lock evaluation is selected, then determining whether the selected part design is complex;

if the part design is not complex, then casting evenly-spaced rays through the surfaces of the part design, the casted rays being parallel to the die open direction;

sorting the points of intersection for each ray;

if any casted ray has greater than a threshold intersecting number, then determining that the part design has die lock;

if the part design is complex, then defining a normal vector having an origin from a surface of the part design;

casting a single ray from the origin of the normal vector, the casted ray being in the direction parallel the die open direction;

determining the number of intersections of the single casted ray;

if the single casted ray has greater than one intersection, then determining that the part design has die lock;

if the draft evaluation is selected, then defining a normal vector for a surface;

finding a first angle between the normal vector and die open direction;

if the difference between a reference angle and the first angle is less than a minimum draft angle, then indicating the surface as having insufficient draft;

if the difference between the reference angle and the first angle is greater than the minimum draft angle, then indicating the surface as having sufficient draft;

if the sharp edge evaluation is selected, then determining a second angle between a pair of adjoining surfaces to define an edge;

determining the supplementary angle of the second angle;

if the supplementary angle is greater than a minimum sharp edge angle, then indicating the edge as having a sharp edge;

if the supplementary angle is less than the sharp edge angle, then indicating the edge as not having a sharp edge.

8. An inspection system for a selected part design from an inventory of computer-aided part designs for die operation compliance as to the part design's geometric characteristics of die lock, draft, and a sharp edge, the system comprising:

a first mechanism for selecting the part design to be inspected for die lock, draft, and sharp edge compliance so that geometric information for the selected part design is acquired;

a second mechanism for defining a die open direction for the selected part design based on the geometric information of the selected part design;

a third mechanism for evaluating the die lock and draft characteristics of the selected part design with respect to the defined die open direction to determine if the die will open in the direction defined; and a fourth mechanism for evaluating the sharp edge characteristic of the part design irrespective of the defined die open direction to determine the degree of edge sharpness in comparison to a predetermined geometric characteristic of edge sharpness for the selected part design.

* * * * *